(12) United States Patent
Wang (10) Patent No.: US 7,710,488 B2
(45) Date of Patent: May 4, 2010

(54) METHOD OF ACQUIRING MULTIMEDIA DATA AT A DESIRABLE TIMING AND APPARATUS THEREOF

(75) Inventor: John C. Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 1292 days.

(21) Appl. No.: 11/192,032

(22) Filed: Jul. 29, 2005

(65) Prior Publication Data

US 2006/0034600 A1    Feb. 16, 2006

(30) Foreign Application Priority Data

Aug. 10, 2004    (TW) .............................. 93123976 A (51) Int. Cl.
*H04N 5/222* (2006.01)
(52) U.S. Cl. .............................. 348/333.05; 348/333.11
(58) Field of Classification Search ............. 348/220.1, 348/223.1, 229.1, 230.1, 333.01, 333.05, 348/333.11, 362–363; 386/120–121
See application file for complete search history.

(56) References Cited

U.S. PATENT DOCUMENTS

2001/0028394 A1* 10/2001 Matsumoto et al. ......... 348/207
2003/0063213 A1*  4/2003 Poplin ........................ 348/362
2003/0189647 A1* 10/2003 Kang ..................... 348/207.99
2004/0169767 A1*  9/2004 Norita et al. ................. 348/350
2004/0227978 A1* 11/2004 Enomoto .................... 358/3.26
2005/0185055 A1*  8/2005 Miller et al. ............. 348/207.1

FOREIGN PATENT DOCUMENTS

CN            1384008 A    12/2002

OTHER PUBLICATIONS

XP-002355903, "EX-P505-Movie Features" Internet Article, Jan. 2005.
XP-002357135, "Casio erweitert seine Exilim-Pro-Serie um die EX-P505" Internet Article, Jan. 31, 2005.
XP-002355957, "Taking Pictures and videos us8ing burst" DX 7630 Zoom Digital Camera, Jan. 2005.
XP-002357136, Michael R. Tomkins, "Kodak announces two new Easy Share digicams" Internet Article, Jan. 5, 2005.

* cited by examiner

*Primary Examiner*—Kelly L Jerabek
(74) *Attorney, Agent, or Firm*—Rabin & Berdo, PC (57) ABSTRACT

A method of acquiring multimedia data and a multimedia data acquisition apparatus are disclosed. Pre-acquisition of multimedia data is performed before a user activates a triggering device, such as a shutter. The invention improves the quality of multimedia acquiring. By using the processing procedure of the invention, when capturing images, the user can select the image having the best quality and being acquired at the best timing according to the image capturing results.

16 Claims, 5 Drawing Sheets

METHOD OF ACQUIRING MULTIMEDIA DATA AT A DESIRABLE TIMING AND APPARATUS THEREOF

This application claims the benefit of Taiwan application Serial No. 093123976, filed Aug. 10, 2004, the subject matter of which is incorporated herein by reference.

BACKGROUND OF THE INVENTION

1. Field of the Invention

The invention relates in general to a method of acquiring multimedia data, and more particularly to a method of acquiring multimedia data, by which multiple sets of multimedia data are pre-acquired before a user triggers the data acquisition process, and an apparatus thereof.

2. Description of the Related Art

Timing and exposure are two factors that impact the aesthetic quality of a photo.

There often is a brief delay between the "perfect picture moment" and the actual moment a user physically presses the shutter button. Further more, there often is yet another delay between the time the shutter button is pressed and the time the shutter is actually activated. As a result of such delays, the user sometimes fails to capture the "perfect moment" when taking pictures.

For example, the user might intend to capture the instant when a child is about to pick up a flower, but due to delays, may instead end up with a picture of the child holding the flower and walking away.

Thus, in hope of addressing such a problem, many cameras on the market are equipped with a continuous shooting feature. This prior art solution requires the user to anticipate the arrival of such a perfect moment and presses the shutter button before hand. Since the user cannot always predict the future accurately, despite only few seconds into the future, continuous shooting does not fully address the problem.

Further more, when the user incorrectly anticipates the apparent arrival of a perfect moment and starts continuous shooting feature, user inconveniently faces a large number of unwanted images that need to be deleted. Referring to the last example, let us assume the child is about to pick up the flower, but is then distracted by a butterfly and decides to pursue the butterfly instead, then under such a circumstance, the outcome is unanticipated. As a result, the user is now required to delete the undesired pictures, often manually, and often one by one.

Even when timing is ideal, a user sometimes wishes to adjust the image attributes, such as brightness, contrast and colors. However, the optimal setting often includes adjustments on more than just one attribute, yet prior art solutions allow the user to adjust each attribute only one at a time.

For instance, if the user only adjusts the brightness, the image may become bright enough but misty; if the user only adjusts the contrast, then the objects in the image may appear aged and overshadowed. The user ultimately needs to try limitless number of combinations of brightness and contrast settings in order to ascertain the optimal result. This process is unintuitive and challenging.

SUMMARY OF THE INVENTION

It is therefore an object of the invention to provide a method of acquiring multimedia data and the apparatus thereof. The method includes pre-acquiring and storing multiple sets of multimedia data prior to the user-triggered time of capture, and continuing to capture multiple sets of multimedia data after the user-triggered time of capture, thus enabling the generation of a set of multiple images from which the user may choose. In addition, the method includes adjusting the attributes of the resulting multimedia data chosen by the user and displaying multiple adjusted multimedia images. Thus, the user may simply select the image that appears the best, sidestepping the need to try out various combinations of multiple attribute settings. The end result is the ideal image with the desirable timing and exposure.

The invention achieves an above-identified object by providing a method of acquiring multimedia data applied in a multimedia acquisition apparatus. The multimedia acquisition apparatus includes an image sensor, a triggering device, and a buffer memory. The method includes the following steps. First, a data pre-acquisition process is performed by acquiring multimedia data by the multimedia sensor before the triggering device is activated. The multimedia data acquired by the image sensor in the data pre-acquisition process are then stored in the buffer memory. When the triggering device is activated, the image sensor is utilized to continue capturing at least a set of multimedia data to store in the buffer memory. Before the triggering device is activated in the step of storing the multimedia data acquired by the image sensor in the buffer memory, in case when the quantity of the sets of multimedia data stored in the buffer memory exceeds a preset storage number, the most recently acquired multimedia data are written over the first stored multimedia data utilizing the first-in-first-out scheme.

The method of acquiring multimedia data further includes the following steps: first, displaying the image of at least a set of multimedia data for user selection; and deleting the displayed-but-not-selected multimedia data. The object of the above-identified step is to allow the user to select the image, corresponding to the multimedia data, which he or she identifies as being captured with the best timing.

The method of displaying the image, of at least a set of multimedia data to provide the user with at least a selection, can be realized by displaying one set of multimedia data, e.g. one image, at a time, thus allowing the user to consider which set of the multimedia data desirable to retain one by one; or by displaying multiple sets of multimedia data at a time, thus allowing the user to choose the best among the sets displayed. After the displayed-but-not-selected multimedia data are deleted, a step is performed to present additional sets of the multimedia not yet displayed. By such an iterative method, as if going through rounds of elimination, multiple set of multimedia data are provided to the user, and only the ones the user identifies as most desirable are ultimately retained.

The method of acquiring multimedia data further includes the steps of adjusting the attributes of the multimedia data selected by the user, for generating multiple sets of adjusted multimedia data. If the sets of multimedia data are photo images, adjusting the attributes of the multimedia, in particular, refers to adjusting the associated picture quality attributes of the photo images, such as brightness, contrast, and colors, or the combination thereof.

The method of acquiring multimedia data further includes displaying the image of at least a set of adjusted multimedia data to provide the user with at least a selection, and deleting the adjusted multimedia data previously displayed but not selected by the user. The method of displaying the image, of at least a set of multimedia data to provide the user with at least a selection, can either include the following step of displaying one set of multimedia data at a time, thus allowing the user to decide one by one the multimedia data to keep, or displaying multiple sets of multimedia data at a time, thus allowing the user to select a set of the multimedia data. After deleting the multimedia data that are displayed but not selected, the multimedia data that have not been displayed, along with the selected multimedia data, are thereafter displayed collectively. Therefore, as if going through rounds of elimination, multiple sets of multimedia data are provided to the user for selection, and only the ones the user considers desirable are retained. The method also includes storing the adjusted multimedia data ultimately selected by the user.

The invention achieves an above-identified object by providing a method of acquiring multimedia data including the following steps: acquiring at least a set of multimedia, data by the image sensor; then, storing multimedia data acquired by the multimedia sensor in the buffer memory when the triggering device is activated; then, adjusting the attributes of the multimedia data to generate multiple sets of adjusted multimedia data, where the attributes of the multimedia data include brightness, contrast, and colors, or the combination thereof; then, displaying at least a set of adjusted multimedia data to provide a user at least a selection; next, deleting the adjusted multimedia data previously displayed but not selected by the user, and simultaneously displaying both the adjusted multimedia data that have not been displayed and the adjusted multimedia data previously selected by the user, and iteratively providing the user with further sets of selections; and, storing the adjusted multimedia data ultimately selected by the user.

The invention achieves another above-identified object by providing a multimedia data acquisition apparatus, including a triggering device, an image sensor, a memory, and a calculating unit. The image sensor is coupled to the triggering device, and the image sensor acquires at least a set of multimedia data before the triggering device is activated. The memory is for storing the acquired multimedia data. The calculating unit is for adjusting the attributes of the acquired multimedia data in order to adjust picture attributes of brightness, contrast and colors, or the combination thereof, and for generating multiple sets of adjusted multimedia data. The multimedia data acquisition apparatus further includes a display apparatus and an input apparatus. The display apparatus is for displaying the acquired multimedia data and the sets of adjusted multimedia data to provide the user with at least a selection.

The input apparatus is for providing the user with input signals for activating the calculating unit so as to process the acquired multimedia data and the sets of adjusted multimedia data. The user can utilize the input apparatus to select a set of multimedia data from the acquired multimedia data and the sets of adjusted multimedia data. Preferably, if the quantity of the sets of multimedia data acquired by the image sensor and stored in the memory exceeds the preset storage number, the above mentioned method can utilize the first-in-first-out scheme to write the most recently acquired multimedia data over the first stored multimedia data. When the triggering device is activated, the image sensor continues to acquire multiple sets of multimedia data, and storing the acquired multimedia data in the memory. When the calculating unit performs adjustments to the attributes of the acquired multimedia data, the results from different combinations of attribute adjustments are presented to the user for user selection Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
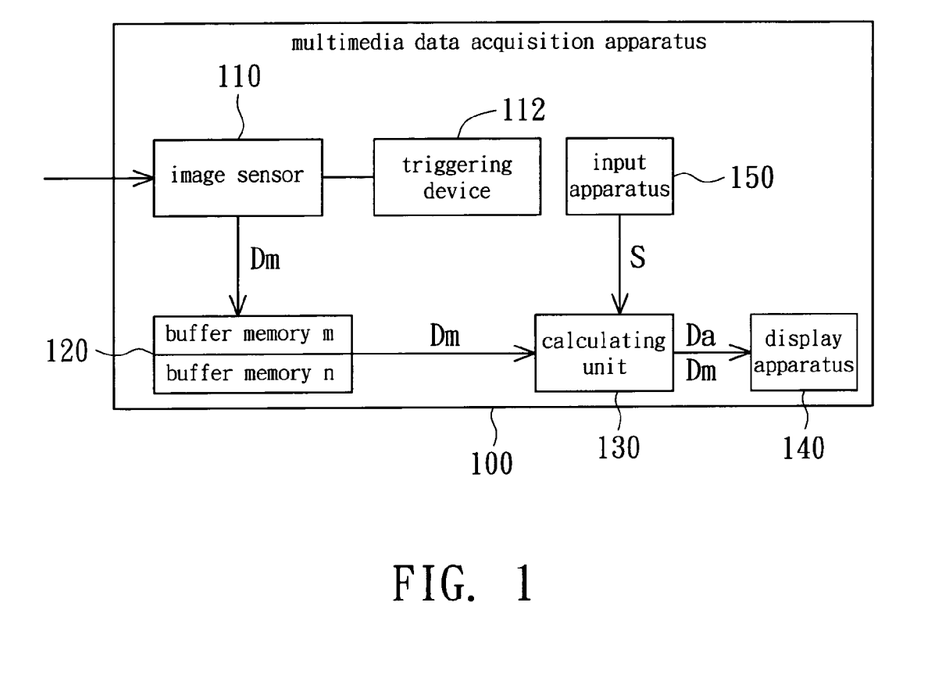
FIG. 1 shows a block diagram of the multimedia data acquisition apparatus according to a preferred embodiment of the invention.

FIG. 1 shows a block diagram of the multimedia data acquisition apparatus according to a preferred embodiment of the invention. The multimedia data acquisition apparatus 100 includes an image sensor 100, a triggering device 112, a buffer memory 120, a calculating unit 130, a display apparatus 140 and an input apparatus 150.

In operation, the image sensor 110 pre-acquires at least a set of multimedia data Dm before the triggering device 112 is activated by the user, and stores the acquired multimedia data Dm in the buffer memory 120. Image sensor 110 continues to acquire additional n sets of multimedia data Dm, e.g. 4 sets of multimedia data, after the user triggers the triggering device 112. The n sets of acquired data Dm are also stored in the buffer memory 120.

The calculating unit 130 performs adjustments on the attributes of the acquired multimedia data Dm to improve quality aspects of the acquired multimedia data, and generate multiple sets of adjusted multimedia data Da. The different attributes are selected from the group consisting of brightness, contrast, colors, and the combination thereof. Advantageously, the attributes are fine-tuned by virtue of matrix computation.

To provide viewing, the display apparatus 140 is employed to display the acquired multimedia data Dm and the adjusted multimedia data Da, which are selectable by the user via an input interface.

The input apparatus 150 serves as the above-identified input interface and is in communicative relation with the calculating unit 130. Upon user command, the input apparatus 150 generates a signal S initiating performance of attribute adjustments. Whence, the images having the best exposure effects are presented to the user via the display apparatus 140.

Large quantity of multimedia data Dm, such as being representative of photo images, is continuously acquired by the image sensor 110. As a result, the buffer memory is likely to be deficient of storage capacity as time progresses. A first-in-first-out scheme is therefore adapted to write the most recently acquired multimedia data Dm over the first stored multimedia data Dm when the quantity of multimedia data Dm exceeds a preset storage number m, e.g. m equals five sets of data, thereby maximizing memory reuse.

A substantial amount of power is consumed if the image sensor 110 is constantly engaged for the continuous capture of multimedia data Dm; thus, several alternatives are provided in the embodiments of the invention to conserve power.

One embodiment involves activating the image sensor 110 primarily through user initiation. For instance, the image sensor 110 can be configured in electrical communication with an external switch, which is operable only as deemed necessary by the user to trigger-start the image sensor 110.

Another embodiment for power conservation lies in providing a two-stage triggering approach. The triggering device 112 is advantageously an external push button equipped with a two-stage trigger; e.g. the push button can either be halfway depressed or fully depressed. The image sensor 110 thus does not engage in the pre-acquiring of multimedia data Dm until the external push button is halfway depressed, whereby power is conserved.

A third power-saving embodiment entails the application of a micro-distance sensor disposed in proximity with the triggering device 112, so as to predict whether the user intends to acquire multimedia data or not. This prediction can for instance be accomplished by assessing the sensor readings associated with relative displacement of the push button, such as upon contact with the user's finger. If the displacement exceeds a preset value, he image sensor 110 is then triggered to pre-acquire multimedia data Dm accordingly.

Through the scheme as identified above, desirable images are captured despite the failed attempt by the user in correctly activating the triggering device 112 with the best timing. That is, with the combined (m+n) sets of multimedia data Dm that are acquired distributively over an extensive time spectrum, the user can simply choose among the (m+n) sets of Dm that he or she identifies as the most desirable when the set of Dm are being displayed on the display apparatus 140.

Although a multimedia data acquisition apparatus shown including an image sensor and a triggering device is taken as an example in the invention, the apparatus can also include other type of photo sensors, and other variations of triggering device, such as light-controlled switches or sound-controlled switches etc.

Figure 2A:
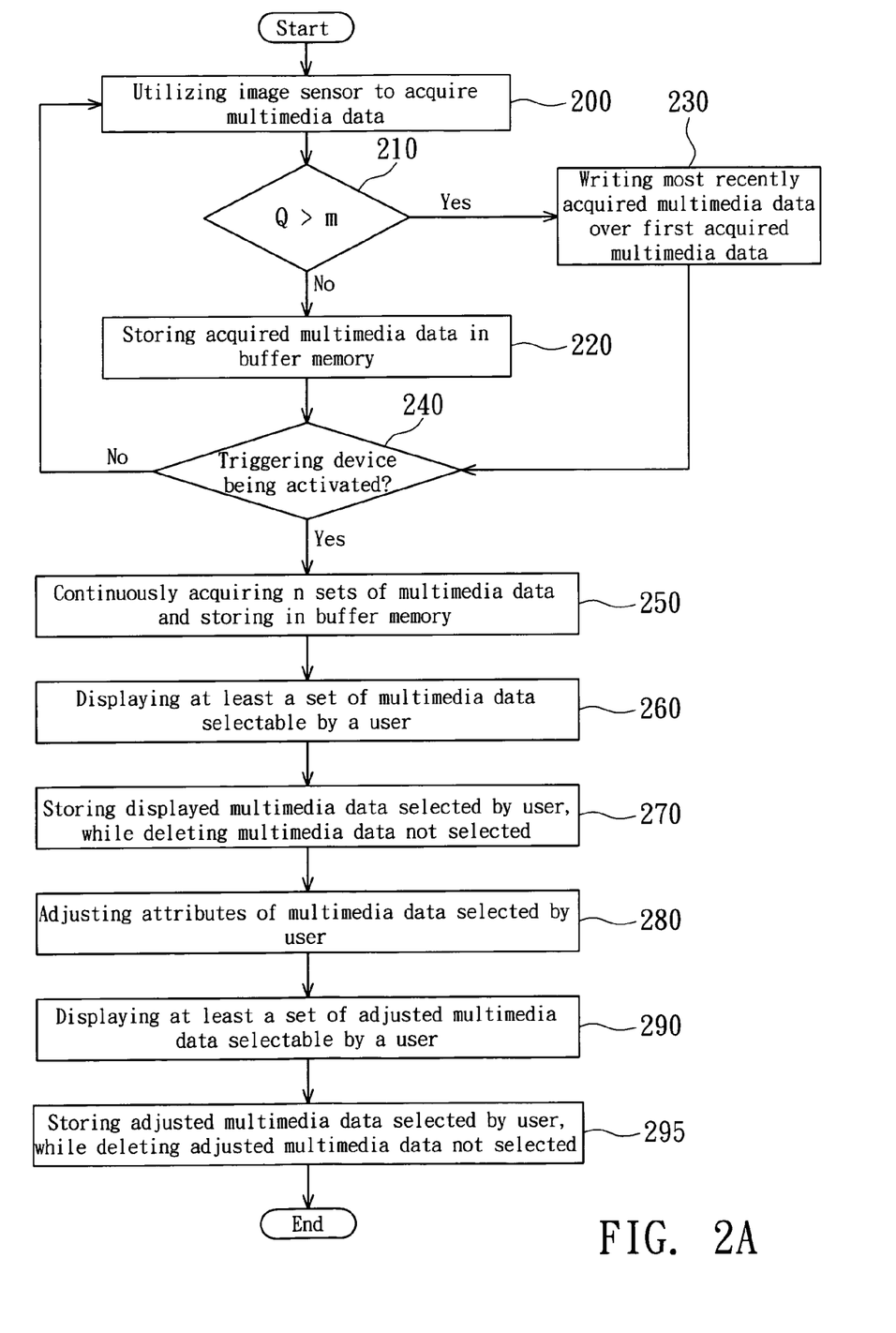
FIG. 2A shows a flow chart of the method of acquiring multimedia data according to a preferred embodiment of the invention.

FIG. 2A shows a flow chart of the method of acquiring multimedia data according to a preferred embodiment of the invention. In this embodiment, a data pre-acquisition process is performed before a user activates the triggering device. When the triggering device is activated, a data acquisition process is performed. Multimedia data acquired by the data pre-acquisition process and data acquisition process are selectively presented for the user to select. Adjusted sets of multimedia data based on a set of multimedia data previously selected are additionally presented for the user to select as one desirable.

The method begins in step 200, in which image data Dm are pre-acquired by the image sensor 110. Step 200 is performed before the triggering device is activated by a user.

After pre-acquiring the image data Dm, the method determines whether sufficient memory space is available in the buffer memory 120 to store the pre-acquired image data, as shown in step 210 for example. Upon this determination, further decisions can be made for allocating memory space, as discussed below in detail.

In this embodiment, a queue for storing the image data acquired during the data pre-acquisition process is implemented in the buffer memory 120. In step 210, a determination is made as to whether the quantity Q of the multimedia data Dm is greater than m, e.g. m=5. If so, step 220 is performed to store the pre-acquired multimedia data Dm in the buffer memory 120. Conversely, if the quantity of multimedia data Dm does exceed 5, the method proceeds to step 230. In step 230, the most recently acquired multimedia data are written over the first stored multimedia data Dm according to the first-in-first-out scheme. Namely, 5 sets of newly acquired multimedia data Dm can be stored in replacement of the earlier recorded multimedia data Dm in the buffer memory 120.

Still referring to FIG. 2A, in step 240, a determination is made as to whether the triggering device 112 is activated or not. If not, the method returns to step 200 to proceed with the data pre-acquisition process. If so, the data pre-acquisition process is terminated and the method proceeds to step 250.

In step 250, a data acquisition process is performed by acquiring additional and consecutive n sets of multimedia data by the image sensor 110; for example, 4 sets of multimedia data Dm (i.e. n=4) are acquired. The n sets of multimedia data Dm are stored in the buffer memory 120. After (m+n) sets of acquired multimedia data Dm are stored, multiple images are generated.

Figure 2B:
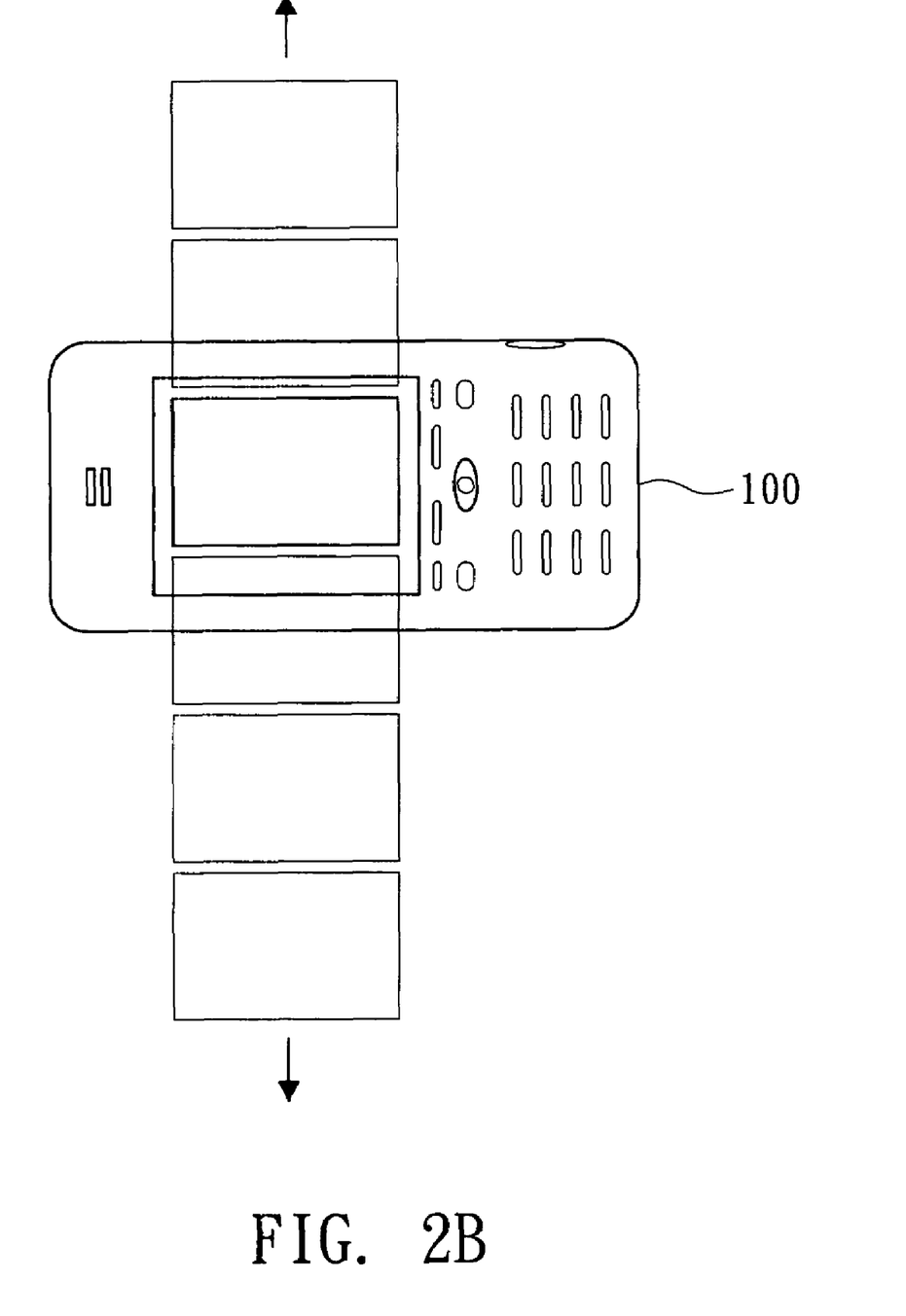
FIG. 2B shows a schematic diagram of the method of displaying a set of multimedia data at a time to provide the user selections according to a preferred embodiment of the invention.

In step 260, at least a set of multimedia data Dm stored in the buffer memory 120 is displayed in the form of images to provide the user with selection options. The display apparatus 140 can display multimedia data Dm sequentially (i.e. one image at a time) to allow the user to examine the images more carefully, as shown in FIG. 2B. Alternatively, multiple sets of multimedia data Dm (such as representing 4 images) can be displayed simultaneously, allowing the user to select a desirable one from the sets of multimedia data displayed.

In terms of selection, the user can choose to temporarily retain one out of the first group of 4 sets of multimedia data Dm being displayed; then, 3 additional sets of multimedia data Dm that have not been displayed are presented to replace the 3 sets of multimedia data previously displayed but not selected by the user, thereby enabling further viewing and selection by the user.

Figure 2C:
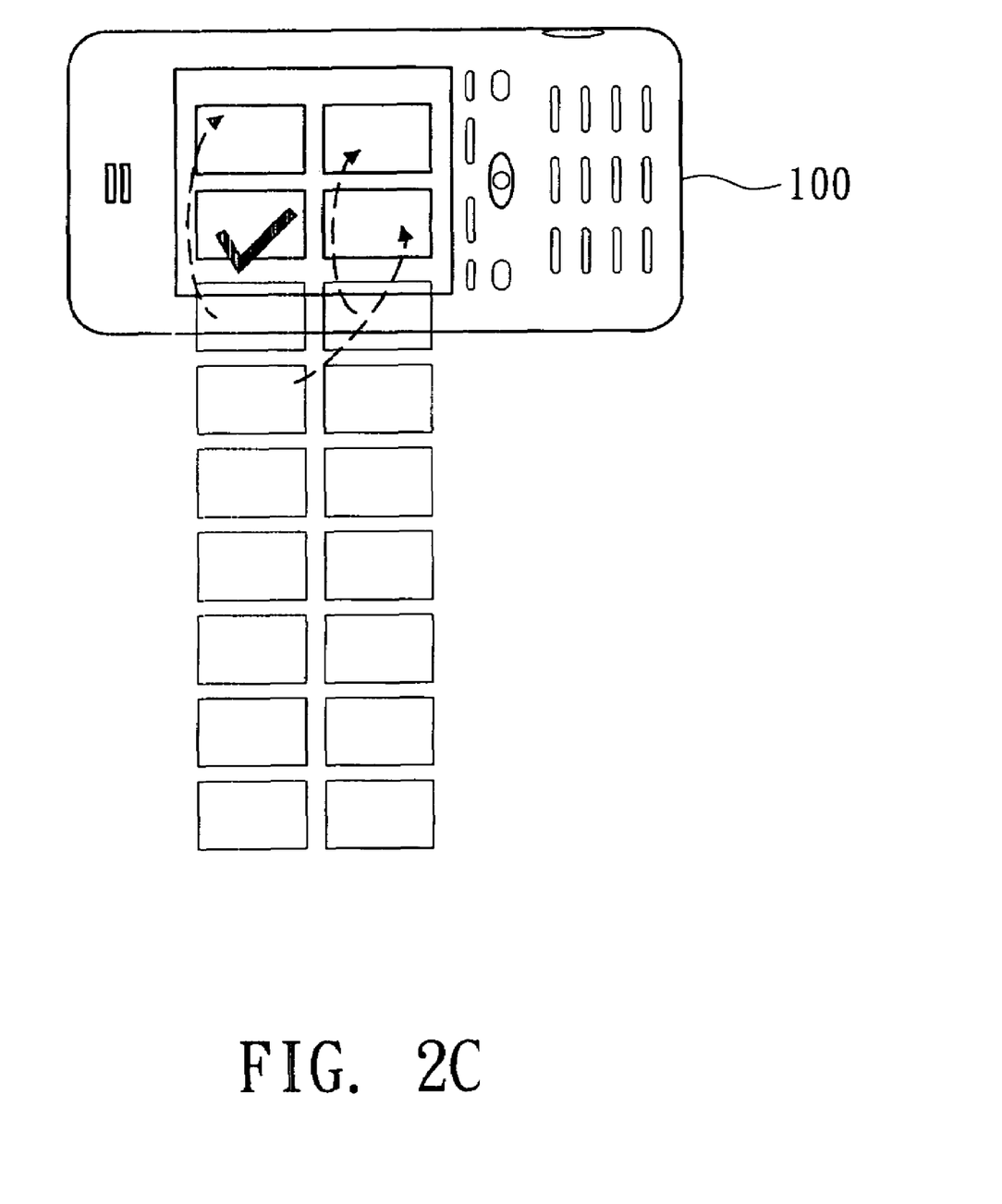
FIG. 2C shows a schematic diagram of the method of displaying four sets of multimedia data at a time to provide the user selections according to a preferred embodiment of the invention.

As a result of above-mentioned steps for image selections and subsequent replacements, the user can again select an image among the newly formed group of four, and continues such iterative elimination process until the user identifies the image he or she mostly desire, as shown illustratively in FIG. 2C.

Optionally, the user may dedicate more than one set of multimedia data Dm displayed as the chosen one to retain. That is, when the first group of four sets of multimedia data Dm are presented, the user can instead select two out of the four sets of multimedia data Dm, and two additional multimedia data that have not been displayed is then presented in place of their displayed-but-not-selected counterparts for further user selection in a new group of four.

The method next proceeds to step 270. In step 270, the displayed multimedia data Dm ultimately selected by the user is stored, and the multimedia data Dm not selected is deleted.

Once the re-allocation of buffer memory is complete by purging unwanted multimedia data Dm, the method then proceeds to step 280. In step 280, the attributes of the multimedia data selected by the user are adjusted. The adjustments lead to the generation of corresponding multiple sets of adjusted multimedia data Da. Multiple attributes, selected from the group consisting of brightness, contrast, colors, and the combination thereof, are being adjusted during this step. Preferably, the attributes are fine-tuned, or adjusted, by applying matrix computation.

Figure 2D:
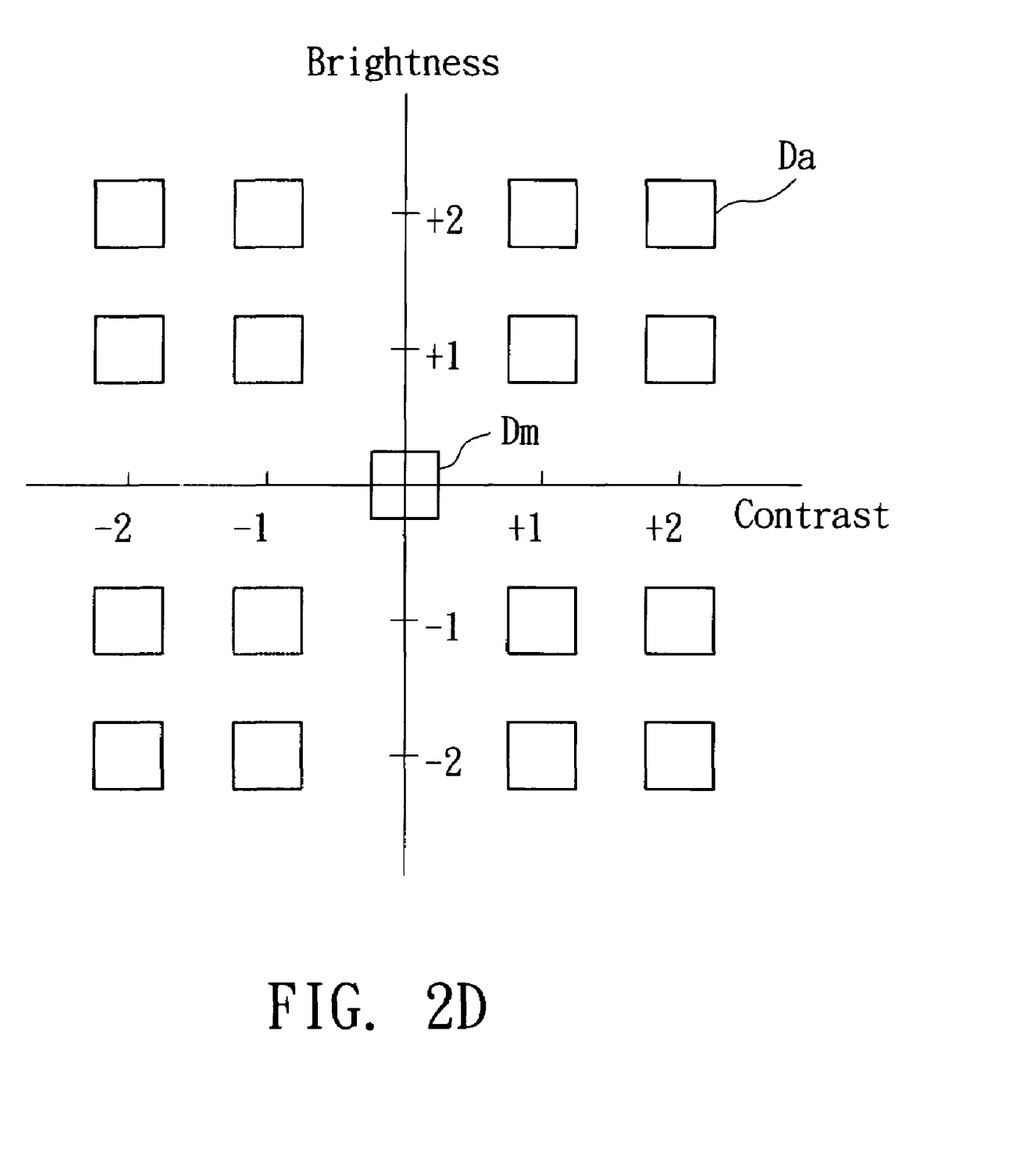
FIG. 2D shows a schematic diagram of a coordinate system for the adjustments of contrast and brightness attributes by virtue of matrix computation.

Referring to FIG. 2D, a schematic diagram of a coordinate system is shown for the adjustments of contrast and brightness attributes by virtue of matrix computation. The horizontal axis represents the fine adjustments of the contrast attribute in increasing contrast, while the vertical axis represents the fine adjustments of the brightness attribute in increasing illumination. The coordinates (0,0) represent the contrast and brightness of the multimedia data Dm that has not undergone any adjustments. If the adjustments further involve colors and other related attributes, the coordinates are required be expanded so as to encompass greater number of dimensions. By incorporating more dimensions, the multimedia data Da possessing various combinations of brightness, contrast and colors adjustments can be generated.

In step 290, the display apparatus 140 displays at least a set of adjusted multimedia data Da selectable by the user. As previously identified, the display apparatus 140 can either display adjusted multimedia data Da sequentially one by one, as shown in FIG. 2B, or display multiple sets of adjusted multimedia data Da simultaneously, as shown in FIG. 2C.

In the embodiment identified in FIG. 2C, the user can select one of the sets of the adjusted multimedia data when the first group of four sets of multimedia data Da are displayed, and additional three sets of the adjusted multimedia data that have not been displayed are presented in place of the adjusted multimedia data previously displayed but not selected, i.e. by deleting the displayed-but-not-selected-adjusted multimedia data. After that, the user can select one set of multimedia data Da from a new group of four sets of adjusted multimedia data Da, and further repeats this reiterative process until the desirable adjusted multimedia data is identified.

As an alternative, the user may choose to select more than one set of the adjusted multimedia data Da at a time. For instance, the user can instead select two out of the first four sets of adjusted multimedia data when being displayed, then any two additional sets of adjusted multimedia data Da that have not been displayed are presented in place of the adjusted multimedia data Da that is not selected by the user.

By such elimination process as proposed in the embodiment of the invention, the user may simply choose from among the adjusted multimedia data Da with one possessing the best exposure effects.

The method is complete at step 295. In step 295, the adjusted multimedia data Da selected by the user is ultimately stored, while the adjusted multimedia data Da not selected are deleted.

The embodiment of the invention allows the pre-acquiring and storing of multiple sets of multimedia data prior to the user-defined time of capture characterized by the activation of the triggering device. The embodiment of the invention further allows additional multiple sets of multimedia data to be acquired after the user-defined time of capture. As a result, all the acquired multimedia data can be displayed in the form of images, thereby allowing the user to select therefrom the images that appear the best qualitatively.

According to the preferred embodiment described above, the method of acquiring multimedia data and the apparatus thereof have the following advantages.

First, the multimedia data acquisition apparatus pre-acquires and stores multiple sets of multimedia data prior to the user-triggered time of capture, and continues to capture multiple sets of multimedia data after the user-triggered time of capture, thus enabling the generation of a set of multiple images from which the user may choose. The result is the ideal image with the desirable timing and exposure.

Secondly, the multimedia data acquisition apparatus according to the embodiment can perform fine adjustments on the captured images according to attributes, e.g. brightness, contrast and colors, for generation of multiple sets of adjusted multimedia data, such as in the form of images. Thus, the user may simply select the image that appears the best, sidestepping the need to try out various combinations of multiple attribute settings.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of acquiring multimedia data, applied in a multimedia data acquisition apparatus, the multimedia data acquisition apparatus comprising a multimedia sensor, a triggering device, and a buffer memory, the method comprising:

performing a data pre-acquisition process by acquiring multimedia data by the multimedia sensor before the triggering device is activated;

storing the multimedia data acquired by the multimedia sensor in performing the data pre-acquisition process in the buffer memory;

terminating the data pre-acquisition process when the triggering device is activated;

displaying at least a set of the multimedia data stored in the buffer memory for a user to select;

deleting the multimedia data previously displayed but not selected by the user; and displaying both the set of multimedia data previously selected by the user and the multimedia data that are stored in the buffer memory but not displayed previously in order to further provide the user with a set of selections after the displayed-but-not-selected multimedia data are deleted.

2. The method of acquiring multimedia data according to claim 1, further comprising:

further acquiring at least a set of multimedia data and storing the acquired set of multimedia data in the buffer memory after the triggering device is activated.

3. The method of acquiring multimedia data according to claim 1, wherein the user is to select a set of multimedia data from at least the set of the multimedia data displayed to provide the user with a set of selections.

4. The method of acquiring multimedia data according to claim 1, further comprising:

adjusting attributes of the multimedia data selected by the user so as to generate sets of corresponding adjusted multimedia data.

5. The method of acquiring multimedia data according to claim 4, wherein a set of multimedia data are image data, wherein the step of adjusting the attributes of the image data selected by the user comprises:

adjusting a plurality of attributes of the selected image data by virtue of matrix computation, the attributes including brightness, contrast and colors.

6. The method of acquiring multimedia data according to claim 4, further comprising:

displaying at least a set of adjusted multimedia data to provide the user with at least a selection.

7. The method of acquiring multimedia data according to claim 6 further comprising:

deleting the adjusted multimedia data previously displayed but not selected by the user.

8. The method of acquiring multimedia data according to claim 7, wherein the user is to select a set of adjusted multimedia data from at least the set of the adjusted multimedia data displayed.

9. The method of acquiring multimedia data according to claim 8, further comprising:

displaying both the set of adjusted multimedia data previously selected by the user and the adjusted multimedia data that have not been displayed in order to further provide the user with a set of selections after the displayed-but-not-selected-adjusted multimedia data are deleted.

10. The method of acquiring multimedia data according to claim 7 further comprising:
storing the adjusted multimedia data ultimately selected by the user.

11. The method of acquiring multimedia data according to claim 1, wherein the step of storing the multimedia data acquired by the multimedia sensor in performing the data pre-acquisition process in the buffer memory comprises:
using a first-in-first-out scheme to write the most recently acquired multimedia data over the first stored multimedia data when the quantity of the sets of multimedia data stored in the buffer memory exceeds a preset storage number.

12. A method of acquiring multimedia data, applied in a multimedia data acquisition apparatus, the multimedia data acquisition apparatus comprising an image sensor, a calculating unit, and a buffer memory, the method comprising:
acquiring at least a set of multimedia data by the image sensor;
storing at least the set of multimedia data acquired by the image sensor in the buffer memory;
adjusting the attributes of the multimedia data for generating a plurality of sets of adjusted multimedia data, the attributes being selected from the group consisting of brightness, contrast, colors, and the combination thereof;
displaying at least a set of the adjusted multimedia data to provide a user at least a selection;
deleting the adjusted multimedia data previously displayed but not selected by the user;
displaying both the set of the adjusted multimedia data previously selected by the user and the adjusted multimedia data that have not been displayed for further providing the user with at least a selection; and
storing the adjusted multimedia data ultimately selected by the user.

13. A multimedia data acquisition apparatus, comprising:
a triggering device;
an image sensor, coupled to the triggering device, wherein the image sensor acquires at least a set of multimedia data before the triggering device is activated;
a memory, for storing the acquired multimedia data;
a calculating unit, for performing attribute adjustments of the acquired multimedia data in order to adjust the attributes, the attributes being selected from the group consisting of brightness, contrast, colors, and the combination thereof, and generating a plurality of sets of adjusted multimedia data;
a display apparatus, for displaying the acquired multimedia data and the sets of adjusted multimedia data selectively to provide a user with at least a selection; and
an input apparatus, operable by the user to input a signal for enabling the calculating unit to process the acquired multimedia data and the sets of adjusted multimedia data;
wherein the display apparatus is further used for displaying both the set of the acquired multimedia data or the adjusted multimedia data previously selected by the user and the acquired multimedia data and the adjusted multimedia data that are stored in the memory but not displayed previously in order to further provide the user with a set of selections after the displayed-but-not-selected acquired multimedia data or the displayed-but-not selected adjusted multimedia data are deleted.

14. The multimedia data acquisition apparatus according to claim 13, wherein the user inputs the signal to the input apparatus for selecting desirable multimedia data from the acquired multimedia data and the sets of adjusted multimedia data.

15. The multimedia data acquisition apparatus according to claim 13, wherein the multimedia data acquired by the image sensor is stored in the memory; if the quantity of the multimedia data stored in the memory exceeds a preset storage number, the most recently acquired multimedia data are written over the first stored multimedia data; and the image sensor continues to acquire at least a set of multimedia data and stores the acquired set of multimedia data in the memory after the triggering device is activated.

16. The multimedia data acquisition apparatus according to claim 13, wherein the attributes are adjusted by virtue of matrix computation.

* * * * *